Patented May 16, 1933

1,909,217

UNITED STATES PATENT OFFICE

ROBERT NOTVEST, OF INDIANAPOLIS, INDIANA, ASSIGNOR TO J. D. ADAMS MANUFACTURING COMPANY, OF INDIANAPOLIS, INDIANA, A CORPORATION OF INDIANA

FLUX COATED WELDING ROD

No Drawing.   Application filed October 19, 1931.   Serial No. 569,864.

It is the object of my invention to provide on iron or steel arc-welding electrodes a coating which will result in the production of a stable arc, which will produce a clean weld without undesirable inclusions, which will form a readily removable slag, and which will increase the speed of the welding operation.

Barium carbonate and calcium carbonate are ingredients commonly used in the coatings of electrodes intended for use in arc welding. These substances have a high rate of thermionic emission, are reducing agents preventing the formation of oxides, and form a slag of comparatively low specific gravity which is brittle when cold and which may be readily removed from the weld.

I have found that the addition of calcium fluoride to a mixture of barium and calcium carbonates has a marked tendency to increase the speed of welding. I have also found, however, that this increase in speed is accompanied by a tendency of the arc to become unstable, but that this instability can be overcome by adding to the mixture forming the coating a quantity of a titanium compound such as titanium oxide, titanium dioxide, or titanium carbonate. If the ingredients are properly proportioned, an electrode coating can be produced which will result in a stable arc and in more rapid welding than can be accomplished with barium and calcium carbonates alone.

My preferred composition includes the ingredients mentioned in the following proportions:

| | Parts by weight |
|---|---|
| Calcium carbonate | 8 |
| Barium carbonate | 9 |
| Titanium dioxide | 22 |
| Calcium fluoride | 11 |

The ingredients are mixed and suspended in a suitable adhesive material, and the rods are then coated with the resulting mixture. Various substances may be used as the adhesive, but I prefer to employ a mixture of approximately ⅔ potassium silicate and approximately ⅓ water. As pointed out in my co-pending application Serial No. 569,865, filed October 19, 1931, potassium silicate has a distinct advantage over the sodium silicate commonly used as an adhesive for electrode-coatings owing to its rapid drying.

I do not wish to be understood as limiting myself to the exact composition set forth above as the preferred example, as the ingredients and the proportions may be varied considerably. As pointed out above, the function of calcium fluoride is to increase the speed of welding, while that of the titanium dioxide is to increase the stability of the arc. The proportion of these ingredients may therefore be varied to suit any desired conditions, the calcium fluoride being proportionately increased if a fast weld is required; while the proportion of the titanium dioxide may be increased if stability of the arc is desired.

Instead of titanium dioxide, titanium oxide or titanium carbonate may be used.

An electrode coated as above set forth is especially adapted for direct-current welding in which the electrode is connected to the negative side of the current-source.

I claim as my invention:

1. An arc-welding electrode provided with a coating comprising approximately 8 parts calcium carbonate, approximately 9 parts barium carbonate, approximately 22 parts titanium dioxide, approximately 11 parts calcium fluoride, and a suitable adhesive.

2. An arc-welding electrode provided with a coating comprising approximately 5 to 15 parts calcium carbonate, approximately 5 to 15 parts barium carbonate, approximately 15 to 30 parts titanium dioxide, approximately 5 to 20 parts calcium fluoride, and a suitable adhesive.

3. An arc-welding electrode provided with a coating comprising a mixture of slag-forming ingredients, and, in addition, titanium dioxide, calcium fluoride, and an adhesive, the titanium dioxide being present in quantities sufficient to counteract the affect of calcium fluoride in rendering the arc unstable.

In witness whereof, I have hereunto set my hand at Indianapolis, Indiana, this 16th day of October, A. D. one thousand nine hundred and thirty-one.

ROBERT NOTVEST.